(12) United States Patent
Ebbehoj et al.

(10) Patent No.: US 10,323,581 B2
(45) Date of Patent: Jun. 18, 2019

(54) GASEOUS FUEL PUMPING SYSTEM

(71) Applicant: WESTPORT POWER INC., Vancouver (CA)

(72) Inventors: Michael Ebbehoj, Vancouver (CA); Kenneth W. Kratschmar, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 202 days.

(21) Appl. No.: 15/519,492

(22) PCT Filed: Oct. 14, 2015

(86) PCT No.: PCT/CA2015/051039
§ 371 (c)(1),
(2) Date: Apr. 14, 2017

(87) PCT Pub. No.: WO2016/058100
PCT Pub. Date: Apr. 21, 2016

(65) Prior Publication Data
US 2017/0241350 A1  Aug. 24, 2017

(30) Foreign Application Priority Data

Oct. 14, 2014  (CA) ...................................... 2866992

(51) Int. Cl.
*F04B 9/08* (2006.01)
*F02D 19/02* (2006.01)
(Continued)

(52) U.S. Cl.
CPC ........... *F02D 19/022* (2013.01); *F02D 25/00* (2013.01); *F02M 21/0245* (2013.01);
(Continued)

(58) Field of Classification Search
CPC .................. F02D 19/022; F02D 25/00; F02D 2200/0602; F04B 49/03; F04B 9/08;
(Continued)

(56) References Cited

U.S. PATENT DOCUMENTS

| 4,337,687 A | 7/1982 | Hoover |
| 6,789,458 B2 | 9/2004 | Schumacher et al. |

(Continued)

OTHER PUBLICATIONS

International Search Report, dated Dec. 18, 2015, for International Application No. PCT/CA2015/051039, 3 Pages.
Written Opinion of the International Searching Authority, dated Dec. 18, 2015, for International Application No. PCT/CA2015/051039, 4 Pages.

*Primary Examiner* — Joseph J Dallo
*Assistant Examiner* — Scott A Reinbold
(74) *Attorney, Agent, or Firm* — Seed IP Law Group LLP (57) ABSTRACT

In high horse power engines there are strict energy budgets allotted for each subsystem. It is a challenge for a gaseous fuel pumping system to supply the necessary gaseous fuel mass flow to the engine while staying within budget. A method for pressurizing a gaseous fuel supplied to an engine comprises providing first and second hydraulically actuated pumping apparatus comprising first and second shuttle valves in first and second hydraulic pistons respectively; and selectively communicating hydraulic fluid flow to the first and second hydraulically actuated pumping apparatuses. In a first mode hydraulic fluid is communicated through the first hydraulically actuated pumping apparatus to the second hydraulically actuated pumping apparatus. In a second mode hydraulic fluid is communicated through the second hydraulically actuated pumping apparatus to the first hydraulically actuated pumping apparatus. The method switches between the first and second modes when a pressure drop in hydraulic fluid pressure associated with the hydraulic fluid flowing through the first and second shuttle valves is detected.

16 Claims, 5 Drawing Sheets

(51) Int. Cl.
  *F02D 25/00* (2006.01)
  *F02M 21/02* (2006.01)
  *F04B 49/03* (2006.01)
  *F04B 49/06* (2006.01)

(52) U.S. Cl.
  CPC ........... *F02M 21/0287* (2013.01); *F04B 9/08* (2013.01); *F04B 49/03* (2013.01); *F04B 49/06* (2013.01); *Y02T 10/32* (2013.01)

(58) Field of Classification Search
  CPC ............... F04B 49/06; F02M 21/0287; F02M 21/0245; F02M 37/04; F02M 69/02; Y02T 10/32
  USPC ........................................................ 123/495
  See application file for complete search history.

(56) References Cited

U.S. PATENT DOCUMENTS

| | | | |
|---|---|---|---|
| 7,739,941 B2 | 6/2010 | Noble et al. | |
| 2008/0302111 A1* | 12/2008 | Batenburg | F04B 9/105 62/50.6 |
| 2009/0173067 A1 | 7/2009 | Pack et al. | |
| 2009/0229275 A1* | 9/2009 | Madison | F04B 37/08 62/50.1 |
| 2014/0023530 A1* | 1/2014 | Frey | F04B 9/117 417/375 |
| 2014/0034162 A1* | 2/2014 | Mackey | F04B 23/021 137/565.29 |
| 2017/0037836 A1* | 2/2017 | Brown | F04B 23/021 |

* cited by examiner

GASEOUS FUEL PUMPING SYSTEM

FIELD OF THE INVENTION

The present application relates to a gaseous fuel pumping system for pressurizing a gaseous fuel in a resource constrained environment.

BACKGROUND OF THE INVENTION

Internal combustion engines supplying motive power to a vehicle generate power not only for propulsion, but also to operate various systems associated with the engine. For example, a fuel pump can be mechanically driven from a power take-off on the engine, or can be electrically driven from a battery that is supplied electrical power from an alternator driven by the engine. In both circumstances, the engine provides power to drive the fuel pump. Over the range of engine operating conditions the engine supplies sufficient power to the fuel pump to meet the fuel demand of the engine.

In all applications there is a finite source of power available from the engine for subsystems to operate without significantly affecting engine efficiency. Continuous improvement in these subsystems reduces power consumption and improves their performance. In high horse power applications the amount energy generated by the engine is relatively large and the power requirement for engines subsystems to operate is significant. Stringent power budgets are established for specific engine components such that the overall system performance can be successfully managed. One such application is in the rail industry, where one or more locomotives supply electrical power to drive a liquefied gaseous fuel pumping apparatus on a tender car. Each locomotive comprises an internal combustion engine that is fuelled with a gaseous fuel stored in liquefied form for driving electrical generators that generate alternating current (AC) or direct current (DC) electrical energy employed to power electric traction motors in the propulsion system as well as to power other subsystems. One of these electrical generators is known as a companion-alternator that supplies AC electrical energy to components such as cooling fans, cooling pumps, cabin heaters and coffee makers, and to the tender car for the purpose of operating the liquefied gaseous fuel pumping apparatus.

In addition to operating in idle, the locomotives operate in modes called notches, for which conventionally there are 8 levels respectively named Notch 1 up to Notch 8. Each higher notch level represents a higher engine load/speed operating point, and consequently a higher fuel demand. For each subsequently higher notch level, the nature of the AC electrical energy generated by the locomotive changes in both voltage and frequency, since the generators are directly driven by the crank-shaft of the locomotive engine, and as the engine speed varies the generator output varies. Additionally, the amount of AC electrical power that the locomotive can supply increases for each higher notch level since the companion-alternator energy output is directly related to engine speed. A further operating mode, called dynamic braking, occurs when the locomotive is going downhill, where the electric generator is used to slow the train down, and the energy generated is run through large resistor banks on the locomotive.

For each notch level there is a maximum instantaneous electrical power available from the locomotive that the fuel pumping apparatus can consume such that the locomotive can operate at a predetermined performance and efficiency. When the liquefied gaseous fuel pumping apparatus consumes more than the maximum available electrical power, other subsystems may be starved of energy. The maximum instantaneous electrical power is both a maximum-continuous and maximum-peak power level.

The liquefied gaseous fuel pumping apparatus comprises a cryogenic pump that pressurizes the liquefied gaseous fuel upstream of a heat exchanger for vaporizing the gaseous fuel for delivery to a fuel injection system on the locomotive engine. Cryogenic pumps can be reciprocating piston-type pumps that comprise a hydraulic motor and a pump. Unlike fuel pumps associated with conventional liquid fuels such as diesel, cryogenic pumps are operated under extreme environmental conditions that result in unique design requirements that tend to increase the size and power consumption of these pumps compared to diesel fuel pumps. When the gaseous fuel is directly injected into cylinders in the locomotive engine late in the compression cycle, the gaseous fuel pressure must be high enough to overcome the cylinder pressure at the time of injection. The cryogenic pump consumes more power as the gaseous fuel pressure downstream from the pump increases. Even though there is a challenge in designing a liquefied gaseous pumping apparatus for supplying high pressure gaseous fuel suitable for direction injection in a locomotive engine, the benefits of increased power and torque and reduced emissions are worth the costs associated therewith.

A gaseous fuel is any fuel that is in a gas state at standard temperature and pressure, which in the context of this application is 20 degrees Celsius (° C.) and 1 atmosphere (atm). An exemplary gaseous fuel is natural gas, which when stored in a liquefied form at cryogenic temperatures is referred to as liquefied natural gas (LNG). Other examples of gaseous fuels include butane, ethane, hydrogen, propane, and mixtures thereof, and as would be known to one skilled in the art there are many other such examples. Normally, LNG is stored in a vacuum insulated storage vessel at or near its boiling point, which is approximately −160° C. A cryogenic temperature is any temperature typically below −150° C.

There is a need for a gaseous fuel system that can meet the fuel demand of high horse power engines, such as locomotive engines, without consuming more than the maximum instantaneous electrical power at the specified notch level. The state of the art is lacking in techniques for supplying an internal combustion engine with gaseous fuel stored in liquefied form. The present method and apparatus provides a technique for improving a liquefied gaseous fuel pumping system for internal combustion engines.

SUMMARY OF THE INVENTION

An improved method for pressurizing a gaseous fuel supplied to a first internal combustion engine comprises providing a first hydraulically actuated pumping apparatus comprising a first shuttle valve in a first hydraulic piston; providing a second hydraulically actuated pumping apparatus comprising a second shuttle valve in a second hydraulic piston; and selectively communicating hydraulic fluid flow to the first and second hydraulically actuated pumping apparatuses. In a first mode the hydraulic fluid flow is fluidly communicated through the first hydraulically actuated pumping apparatus to the second hydraulically actuated pumping apparatus. In a second mode the hydraulic fluid flow is fluidly communicated through the second hydraulically actuated pumping apparatus to the first hydraulically actuated pumping apparatus. The method switches between the first and second modes when a pressure drop in hydraulic fluid pressure associated with the hydraulic fluid flowing through the first and second shuttle valves is detected. The first and second hydraulically actuated pumping apparatuses are operating 180° out of phase. There can be a third mode where the hydraulic fluid flow is fluidly communicated to a hydraulic fluid reservoir bypassing the first and second hydraulically actuated pumping apparatuses.

The method can further comprise generating the hydraulic fluid flow with electrical power from the first internal combustion engine; and adjusting the hydraulic fluid flow such that the electrical power employed to generate the hydraulic fluid flow is less than a predetermined value as a function of engine operating conditions.

In an exemplary embodiment, the gaseous fuel is supplied additionally to a second internal combustion engine. The method further comprises generating a first portion of the hydraulic fluid flow with electrical power received from the first internal combustion engine; generating a second portion of the hydraulic fluid flow with electrical power received from the second internal combustion engine; adjusting the first portion of hydraulic fluid flow such that the electrical power received from the first internal combustion engine is less than the first predetermined value as a function of engine operating conditions; and adjusting the second hydraulic fluid flow such that the electrical power received from the second internal combustion engine is less than a second predetermined value as a function of engine operating conditions. In another preferred embodiment, the method can comprise combining the electrical power from the first internal combustion engine with the electrical power from the second internal combustion engine, such that the combined electrical power is employed to generate the hydraulic fluid flow.

An improved gaseous fuel pumping system comprises a hydraulic fluid reservoir and a first hydraulic pump fluidly connected with the hydraulic fluid reservoir. There is also a first cryogenic pumping apparatus comprising a first hydraulic motor having a first piston reciprocating in a first cylinder. The first piston comprises a first shuttle valve for selective fluid communication of hydraulic fluid through the first piston. The first shuttle valve is in a closed position when the first piston travels in the first cylinder and in an open position when the first piston is at opposite ends of the first cylinder. There is a second cryogenic pumping apparatus comprising a second hydraulic motor having a second piston reciprocating in a second cylinder. The second piston comprises a second shuttle valve for selective fluid communication of hydraulic fluid through the second piston. The second shuttle valve is in a closed position when the second piston travels in the second cylinder and in an open position when the second piston is at opposite ends of the second cylinder. A fluid switching apparatus is operatively and fluidly connected with the hydraulic fluid reservoir, the first hydraulic pump and the first and second hydraulic motors. The fluid switching apparatus is actuatable between a first position and a second position. In the first position hydraulic fluid flows from the hydraulic pump to the first hydraulic motor, and from the first hydraulic motor to the second hydraulic motor, and from the second hydraulic motor to the hydraulic fluid reservoir. In the second position hydraulic fluid flows from the hydraulic pump to the second hydraulic motor, from the second hydraulic motor to the first hydraulic motor, and from the first hydraulic motor to the hydraulic fluid reservoir.

In an exemplary embodiment, the first hydraulic pump is a variable displacement hydraulic pump. When the variable displacement pump is a swash plate pump, hydraulic flow from the first hydraulic pump is adjusted by adjusting a swash plate angle. In another exemplary embodiment the gaseous fuel pumping system further comprises a first electric motor connected with and driving the first hydraulic pump, and the hydraulic flow from the first hydraulic pump is adjusted by adjusting the speed of the first electric motor.

In an exemplary embodiment the gaseous fuel pumping system supplies gaseous fuel to a first internal combustion engine. The gaseous fuel pumping system further comprises a first electric motor receiving electrical power from the first internal combustion engine and driving the first hydraulic pump. There is an electronic controller operatively connected with at least one of the first electric motor and the first hydraulic pump to command the hydraulic flow. The electronic controller is programmed to adjust the hydraulic flow such that the instantaneous electrical power consumption of the first electric motor is below a first predetermined value, where the predetermined value is a function of operating conditions of the first internal combustion engine.

In another exemplary embodiment, the gaseous fuel pumping system supplies gaseous fuel to a second internal combustion engine. The gaseous fuel pumping system further comprises a second hydraulic pump fluidly connected with the hydraulic fluid reservoir and fluidly connected with the first hydraulic pump such that the hydraulic outputs of the first and second hydraulic pumps are combined. A second electric motor receives electrical power from the second internal combustion engine and drives the second hydraulic pump. The electronic controller is operatively connected with at least one of the second electric motor and the second hydraulic pump to command the hydraulic flow from the second hydraulic pump. The electronic controller is programmed to adjust the hydraulic flow from the second hydraulic pump such that the instantaneous electrical power consumption of the second electric motor is below a second predetermined value, where the second predetermined value is a function of operating conditions of the second internal combustion engine.

An improved gaseous fuel pumping system supplying gaseous fuel to a first internal combustion engine comprises a hydraulic fluid reservoir; a first electric motor receiving electrical power from the first internal combustion engine; and a first hydraulic pump connected with and driven by the first electric motor and fluidly connected with the hydraulic fluid reservoir. There is also a first cryogenic pumping apparatus; and a fluid switching apparatus fluidly connected with the first hydraulic pump, the hydraulic fluid reservoir, and the first cryogenic pumping apparatus. The fluid switching apparatus is actuatable to control the direction of hydraulic fluid flow from the first hydraulic pump through the first cryogenic pumping apparatus. An electronic controller is operatively connected with at least one of the first electric motor and the first hydraulic pump. The electronic controller is programmed to command the at least one of the first electric motor and the first hydraulic pump to adjust the hydraulic fluid flow such that the instantaneous electrical power consumption of the first electric motor is below a first predetermined value, where the first predetermined value is a function of operating conditions of the first internal combustion engine. The first hydraulic pump is one of a fixed displacement pump and a variable displacement pump.

In an exemplary embodiment the gaseous fuel pumping system further comprises a second cryogenic pumping apparatus fluidly connected with the fluid switching apparatus and fluidly connected in tandem with the first cryogenic pumping apparatus.

In another exemplary embodiment, the gaseous fuel pumping system further comprises a second electric motor receiving electrical power from a second internal combustion engine; and a second hydraulic pump connected with and driven by the second electric motor. The hydraulic fluid flow from the first hydraulic pump is combined with the hydraulic fluid flow from the second hydraulic pump. The electronic controller is operatively connected with at least one of the second electric motor and the second hydraulic pump. The electronic controller is further programmed to command the at least one of the second electric motor and the second hydraulic pump to adjust the hydraulic fluid flow such that the instantaneous electrical power consumption of the second electric motor is below a second predetermined value, where the second predetermined value is a function of operating conditions of the second internal combustion engine.

DETAILED DESCRIPTION OF PREFERRED EMBODIMENT(S)

Various embodiments of liquefied gaseous fuel pumping systems are described herein that supply pressurized gaseous fuel to high horse power engines. In order to operate the liquefied gaseous fuel pumping systems are supplied with electrical power from these engines, and the maximum instantaneous electrical power that can be consumed by the liquefied gaseous fuel pumping systems is a function of engine operating conditions. The liquefied gaseous fuel pumping systems disclosed comprise techniques to meet the fuel demand of the engine without exceeding the electrical power budget available at specified engine operating conditions. For the purpose of a detailed description, the embodiments herein describe the circumstance when the high horse power engines are locomotive engines. But as would be known to those familiar with the technology, high horse power engines can be employed in other applications, such as by way of example, those employed in marine applications, power generation and mining.

Figure 1:
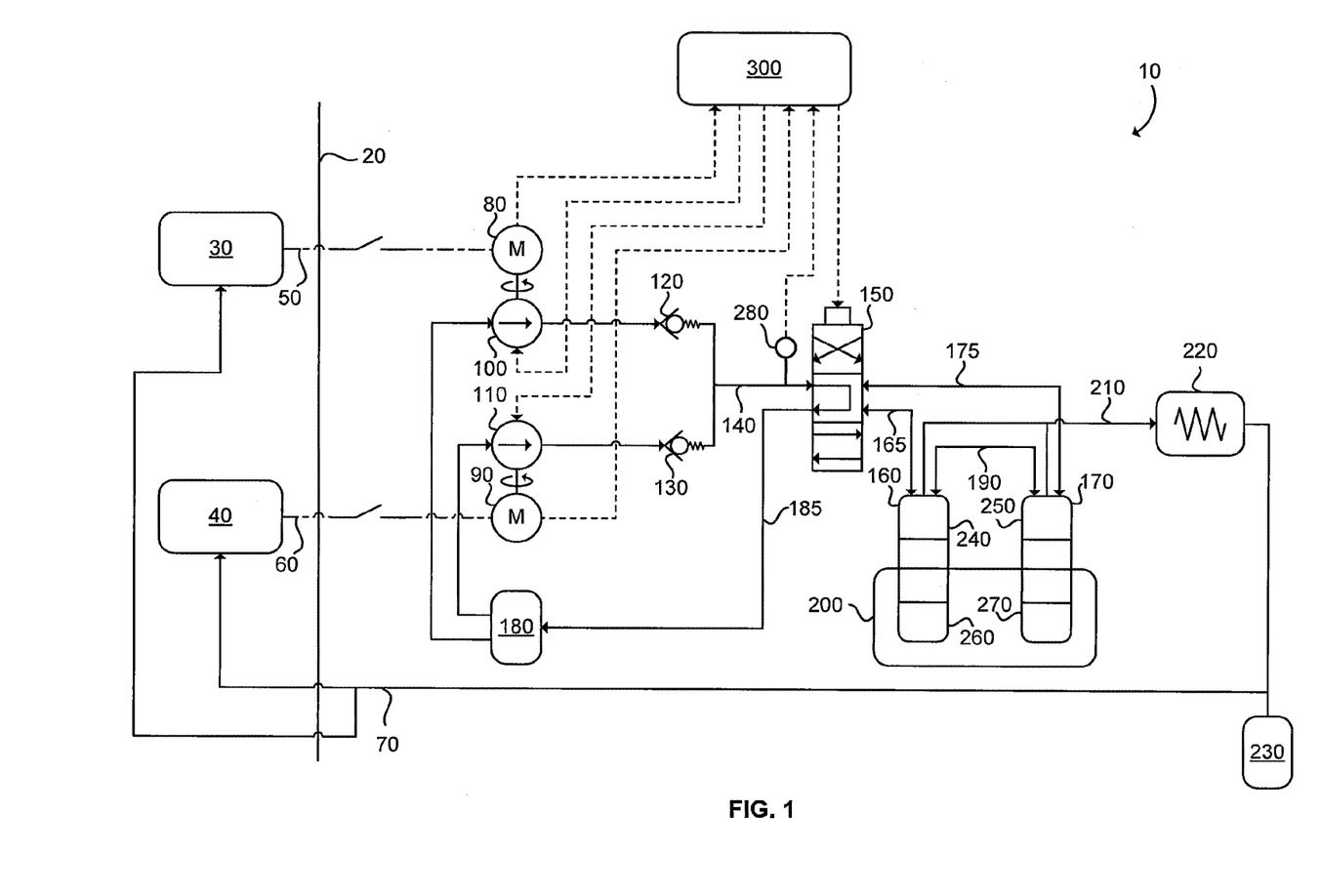
FIG. 1 is a schematic view of a gaseous fuel pumping system according to a first embodiment.

Referring to FIG. 1, tandem pumping system 10 is a liquefied gaseous fuel pumping system illustrated according to a first embodiment. Demarcation line 20 illustrates the interface between tandem pumping system 10, which in an exemplary embodiment is located on a tender car (not shown), and locomotive engines 30 and 40. The tender car receives electrical power from locomotive engines 30 and 40 over electrical cables 50 and 60 for powering tandem pumping system 10 that supplies pressurized gaseous fuel to the locomotives over conduit 70. Depending on the location of the locomotives relative to the tender car conduit 70 can branch out of various locations on the tender car or on one of these locomotives. The electrical power drives electric motors 80 and 90, which in turn drive respective variable displacement hydraulic pumps 100 and 110, which in an exemplary embodiment are swash-plate pumps. The hydraulic flow from hydraulic pumps 100 and 110 is combined after check valves 120 and 130, which are employed to prevent back flow. In other embodiments check valves 120 and 130 can be integrated in hydraulic pumps 100 and 110 in which case external check valves are not required. The combined hydraulic flow is communicated through conduit 140 to fluid switching apparatus 150 that selectively communicates the hydraulic fluid to a variety of downstream conduits. In the illustrated embodiment fluid switching apparatus 150 is actuatable to any one of three positions, and in each position tandem pumping system 10 is considered to be in a respective mode. In a first position of fluid switching apparatus 150 corresponding with a first mode for tandem pumping system 10, hydraulic fluid is communicated to cryogenic pumping apparatus 160 through conduit 165, and in a second position (corresponding with a second mode) hydraulic fluid flows to cryogenic pumping apparatus 170 through conduit 175, and in a third position (corresponding with a third mode) hydraulic fluid flows to hydraulic fluid reservoir 180 through conduit 185. The hydraulic fluid in reservoir 180 can be engine oil, glycol/water mixture, brake fluid or other types of fluids employed in hydraulic systems. Reservoir 180 can serve as a hydraulic fluid reservoir for other hydraulic systems. Cryogenic pumping apparatuses 160 and 170 are fluidly connected in tandem (in series) such that when hydraulic fluid is communicated to one of these pumps from fluid switching apparatus 150, hydraulic fluid flows from this one pump to the other through conduit 190, as will be explained in more detail below. Cryogenic pumping apparatuses 160 and 170 pressurize liquefied gaseous fuel stored in vessel 200 and are operated 180° out of phase such that one of these pumps is always extending (pumping out liquefied gaseous fuel) and the other retracting (drawing in liquefied gaseous fuel). The output flows of pumping apparatuses 160 and 170 are combined in conduit 210 and the combined flow is fluidly communicated to heat exchanger 220 that vaporizes the liquefied gaseous fuel. By the action of pumping apparatuses 160 and 170 the vaporized gaseous fuel is pressurized in conduit 70. Accumulator 230 acts as a buffer of vaporized gaseous fuel to reduce pressure fluctuations in conduit 70 due to varying downstream demand, such as during transient engine operating conditions.

Electronic controller 300 is operatively connected with hydraulic pumps 100 and 110 and can command a range of hydraulic flows for any given speed at which the pumps are driven by electric motors 80 and 90 respectively. In an exemplary embodiment pumps 100 and 110 are swash-plate pumps and the electronic controller commands a swash-plate angle to adjust hydraulic flow. Electronic controller 300 monitors a predetermined parameter, such as gaseous fuel mass flow rate to locomotive engines 30 and 40, and determines the maximum instantaneous electrical power available from locomotive engines 30 and 40 as function of the predetermined parameter and commands hydraulic fluid flow through pumps 100 and 110 such that the instantaneous electrical power consumed by electric motors 80 and 90 is below the maximum level for respective engines 30 and 40, for any given engine operating condition. There are many other operating parameters that can be monitored to determine the engine operating point in the engine load-engine speed map as would be known by those skilled with the technology. For example, engine speed of each engine 30 and 40 can be monitored and based on the engine speed electronic controller 300 can look-up the corresponding maximum instantaneous electrical power available from each the engines respectively. The locomotives associated with respective engines 30 and 40 can communicate the engine speed over a communication bus that electronic controller 300 is connected with. Engines 30 and 40 can be operating at different points in their respective engine speed-engine load maps, and accordingly can supply different levels of electrical energy to tender pumping system 10. In an exemplary embodiment, electric motors 80 and 90 are connected directly to the companion alternator and therefore will have a speed directly proportional to the speed of engines 30 and 40. As a result electric motors 80 and 90 can be operating at different speeds (rpm) and hydraulic pumps 100 and 110 can provide different ranges of hydraulic fluid flow. The hydraulic flow supplied by respective pumps 100 and 110 is enough to meet the fuel demand required by respective engines 30 and 40. Electric motors 80 and 90 can send speed (rpm) and status information to electronic controller 300. The electric motor speed data can be employed to determine instantaneous power consumption of electric motors 80 and 90. Engines 30 and 40 can increase their respective engine speeds (separately and independently) to increase the maximum instantaneous electrical power available to respective electric motors 80 and 90 in order to increase gaseous fuel pressure downstream and/or increase gaseous fuel mass flow rate.

Figure 2:
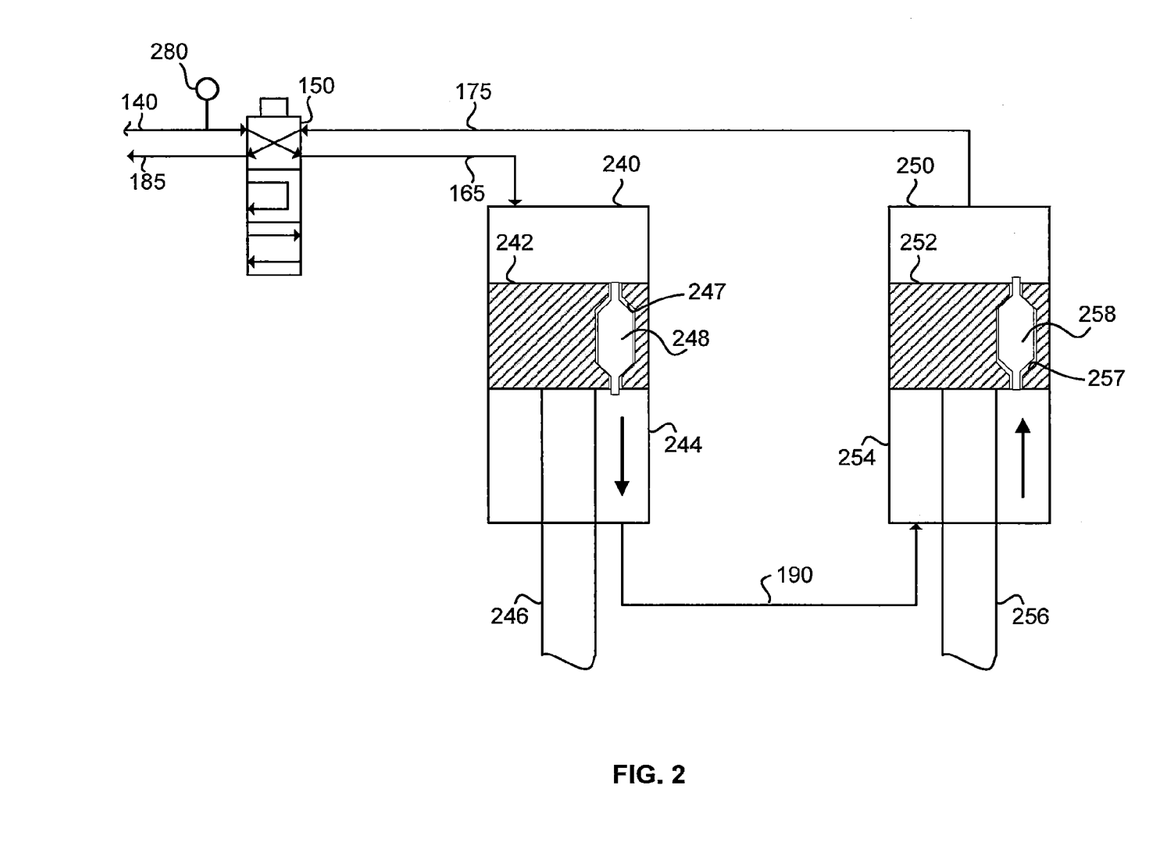
FIG. 2 is a schematic view of the gaseous fuel pumping system of FIG. 1 shown with a fluid switching apparatus in a first position.
Figure 3:
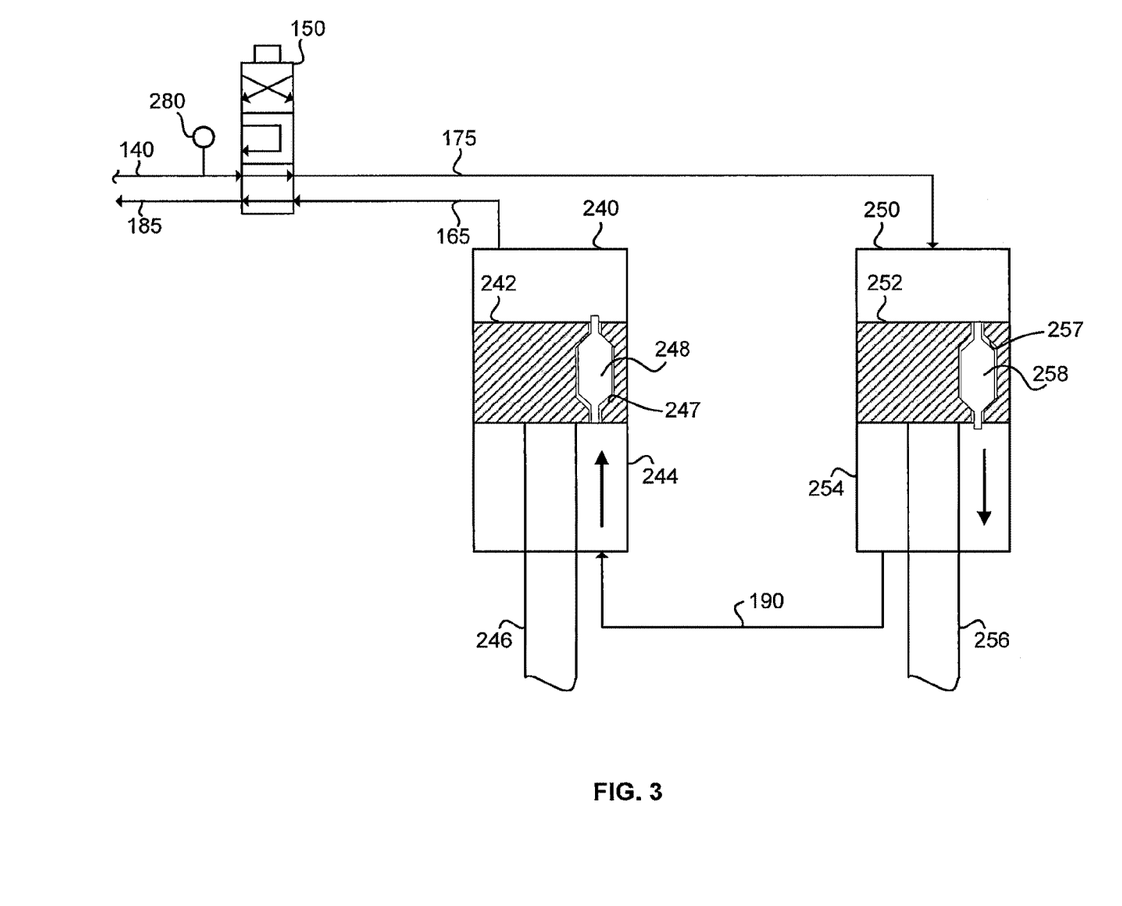
FIG. 3 is a schematic view of the gaseous fuel pumping system of FIG. 1 shown with a fluid switching apparatus in a second position.

Cryogenic pumping apparatuses 160 and 170 are reciprocating piston pumps comprising hydraulic motors 240, 250 and pumps 260, 270 respectively. In the illustrated embodiment hydraulic motors 240, 250 are situated outside vessel 200, which has the advantage of reducing heat leak into the vessel, it is understood that the hydraulic motors can be located inside the vessel, at least partially, in other embodiments. With reference to FIGS. 2 and 3, the operation of hydraulic motors 240 and 250 is described in more detail. Each hydraulic motor 240, 250 comprises double-acting piston 242, 252 reciprocating in hydraulic cylinder 244, 254 and mechanically connected with a piston (not shown) in respective pumps 260, 270 (seen in FIG. 1) by piston rod 246, 256 (seen in FIGS. 2&3). Conduits 165, 175 and 190 are operatively and fluidly connected with respective hydraulic motors 240, 250 such that one of the pumps 260, 270 is retracting (drawing in liquefied gaseous fuel) while the other is extending (pumping liquefied gaseous fuel) such that pumps 260 and 270 are operating 180° out of phase. In FIG. 2, hydraulic motor 240 is extending and hydraulic motor 250 is retracting, and in FIG. 3 hydraulic motor 240 is retracting and hydraulic motor 250 is extending. By operating cryogenic pumping apparatuses 160 and 170 180° out of phase the peak electrical power consumption of tandem pumping system 10 is reduced by half compared to when the pumping apparatuses are operated in phase for any part of their cycles, and compared to when there is only one reciprocating piston-type cryogenic pumping apparatus that pressurizes gaseous fuel half the time (extends half a cycle, retracts half a cycle) and therefore must pump twice as much fuel to meet the same flow rate of two pumps. Moreover, the peak fluid pressure in conduit 140 is reduced by half, which reduces the stress on the components in the hydraulic circuit, such as fluid switching apparatus 150 and hydraulic motors 240, 250.

In an exemplary embodiment, each double-acting piston 242, 252 comprises cavity 247, 257 into which shuttle valve 248, 258 is arranged for controlling the flow of hydraulic fluid across the piston within hydraulic cylinder 244, 254. Shuttle valve 248, 258 closes due to pressure from hydraulic fluid preventing hydraulic fluid flow across piston 242, 252.

As piston 242, 252 reaches either end of hydraulic cylinder 244, 254, shuttle valve 248, 258 contacts the cylinder head and opens a fluid passage through the piston allowing hydraulic fluid to flow through. When one of the pistons 242 and 252 in hydraulic motors 240 and 250 reaches the respective cylinder head before the other, hydraulic fluid continues to flow and move the other hydraulic piston when the shuttle valve opens at the end of a piston stroke. The operation of a unitary hydraulic motor 240, 250 is described in more detail in the Applicant's U.S. Pat. No. 7,739,941, issued Jun. 22, 2010 to Noble et al. Pressure sensor 280 sends signals representative of fluid pressure in conduit 140 to electronic controller 300 such that the electronic controller can command fluid switching apparatus 150 to change hydraulic flow by switching between the first, second and third positions. The fluid pressure in conduit 140 remains relatively high while pistons 242, 252 are travelling in hydraulic cylinders 244, 254, and after both shuttle valves 248, 258 are opened at the end of their respective strokes the fluid pressure drops significantly, and this pressure drop is detected by electronic controller 300 as a signal to switch hydraulic flow. As would be understood by someone familiar with the technology, the pressure across piston 242, 252 is much greater when hydraulic motor 240, 250 is extending compared to when the hydraulic motor is retracting. When operated in this manner cryogenic pumping apparatus 160 and 170 are automatically operated 180° out of phase.

In an exemplary embodiment there can be by-pass valves between conduits 165 and 190 and between conduits 175 and 190 such that only one of the cryogenic pumping apparatuses 160 and 170 can be operated. This is advantageous when one of these pumping apparatuses has an operational problem and cannot be operated. In this situation gaseous fuel can still be supplied at a reduced mass flow rate to locomotive engines 30 and 40 by the pumping apparatus still operating. The by-pass valves can be commanded by controller 300 to open and close as required. Although tandem pumping system 10 is an exemplary embodiment, in other embodiments hydraulic motors 100 and 110 can supply hydraulic fluid to only one cryogenic pumping apparatus.

Figure 4:
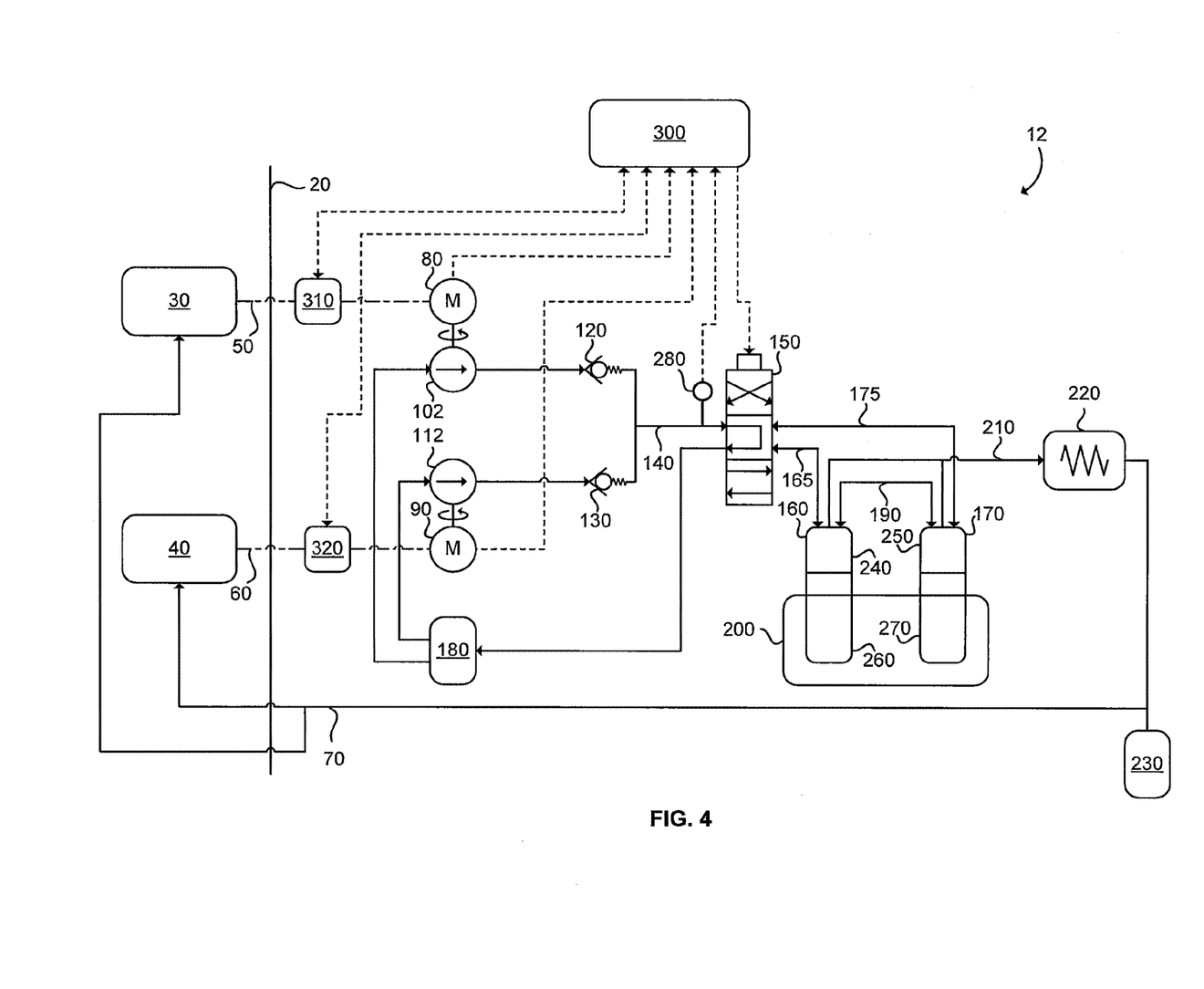
FIG. 4 is a schematic view of a gaseous fuel pumping system according to a second embodiment.

Referring now to FIG. 4, tandem pumping system 12 is illustrated according to a second embodiment similar to the first embodiment, where like parts in this and in all other embodiments have like reference numerals and may not be described in detail, if at all. Hydraulic pumps 102 and 112 are fixed displacement pumps and output a predefined hydraulic flow for a given speed (rpm) of respective electric motors 80 and 90. Motor drivers 310 and 320 are commanded by electronic controller 300 to modify the AC electrical power signals received from respective engines 30 and 40 to vary the speed of respective electric motors 80 and 90 such that the hydraulic flow from pumps 102 and 112 can be adjusted. The frequency and/or the voltage of the AC electrical signals can be modified by motor drivers 310 and 320. Alternatively, when electric motors 80 and 90 are direct current (DC) motors, the AC electrical signals can be converted to respective DC electrical signals and the voltage of the DC signals can be adjusted accordingly. Electronic controller 300 commands hydraulic flow from pumps 102 and 112 such that the instantaneous electrical power consumed by tandem pumping system 12 does not exceed the maximum electrical power available from both engines 30 and 40.

Figure 5:
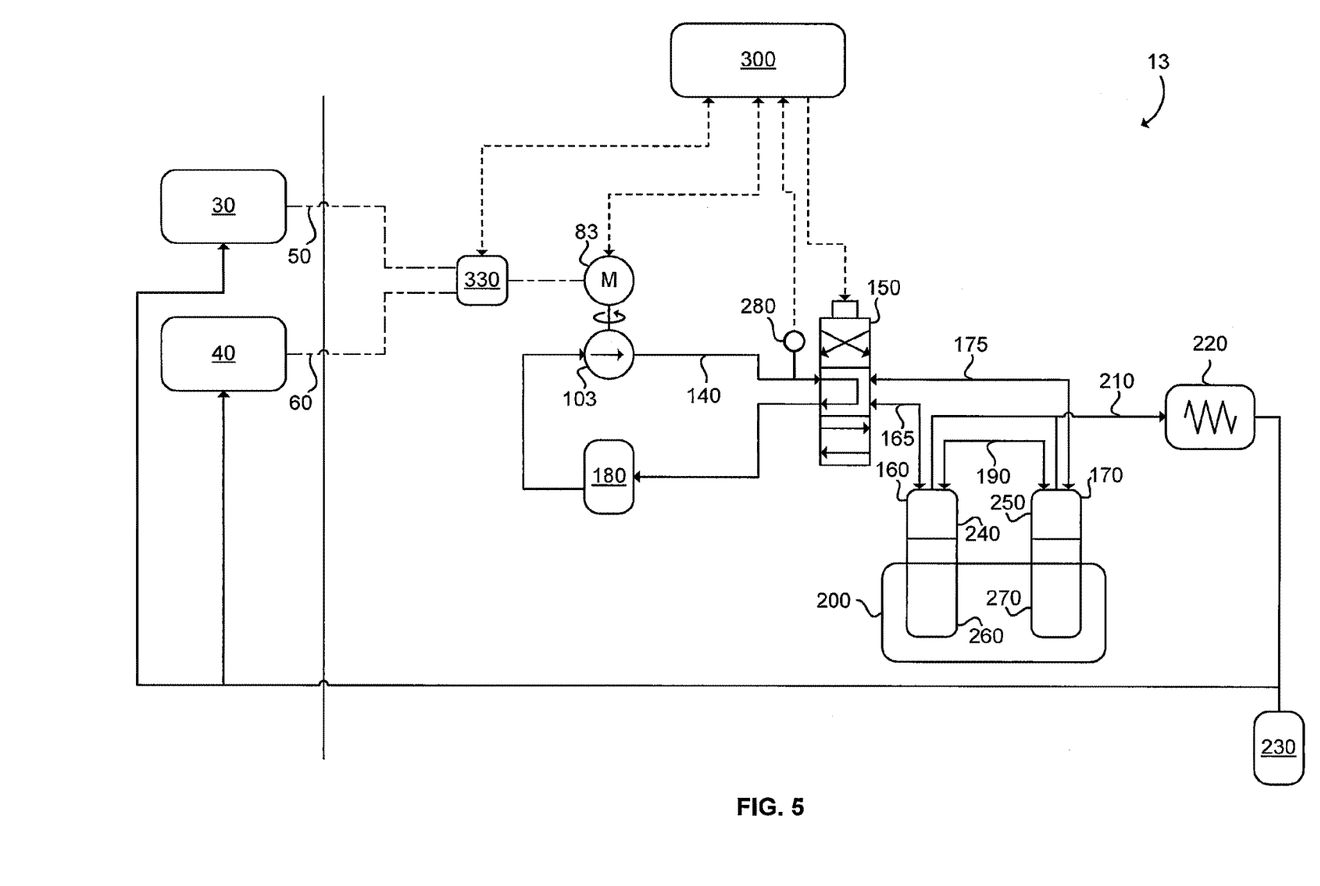
FIG. 5 is a schematic view of a gaseous fuel pumping system according to a third embodiment.

Referring now to FIG. 5, tandem pumping system 13 is illustrated according to a third embodiment. Motor driver 330 combines the AC electrical signals received from engines 30 and 40 and is commanded by electronic controller 300 to generate a drive signal for electric motor 83. Hydraulic pump 103 can be a variable displacement pump, as in the embodiment of FIG. 1, or fixed displacement pump as in the embodiment of FIG. 4. The hydraulic flow can be controlled by adjusting the drive signal supplied to motor 83, and/or by adjusting the swash-plate angle of pump 103. In those embodiments that employ a variable displacement pump, such as a swash plate pump, the hydraulic flow can be adjusted by varying both the swash-plate angle and the speed (rpm) at which the swash plate pump operates. Motor driver 330 electrically isolates the AC electrical power from engines 30 and 40, such as by employing electrical transformers. The drive signal from motor driver 330 can be an AC electrical signal when electric motor 103 is an AC motor, or a DC electrical signal when electric motor 103 is a DC motor.

In other embodiments, tandem pumping systems 10, 12 and 13 can be operated with a single locomotive. In these embodiments cryogenic pumping apparatuses 160 and 170 operate in the manner previously discussed, with the hydraulic flow coming from only one of pumps 100, 102 or 110, 112. When tandem pumping system 13 is operated with electrical energy from only one engine 30 or 40 the hydraulic flow from pump 103 is reduced compared to when it is operated with electrical energy from both engines.

In the foregoing described embodiments, and in other embodiments, cryogenic pumping apparatuses 160 and 170 can be operated at variable speed and variable stroke length such that instantaneous electrical power consumed by electric motors 80 and 90 is below the maximum level for respective engines 30 and 40. This can be advantageous when locomotives 30 and/or 40 are operating at engine loads and engine speeds below their maximum levels. Similarly, the operation of pumping apparatuses 160 and 170 can be adjusted based on the sizing of accumulator 230 such that instantaneous electrical power consumed by electric motors 80 and 90 is below the maximum level for respective engines 30 and 40 under various engine duty cycle and dynamic operation scenarios.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for pressurizing a gaseous fuel supplied to a first internal combustion engine comprising:
   providing a first hydraulically actuated pumping apparatus comprising a first shuttle valve in a first hydraulic piston;
   providing a second hydraulically actuated pumping apparatus comprising a second shuttle valve in a second hydraulic piston; and
   selectively communicating hydraulic fluid flow to the first and second hydraulically actuated pumping apparatuses;
   wherein in a first mode the hydraulic fluid flow is fluidly communicated through the first hydraulically actuated pumping apparatus to the second hydraulically actuated pumping apparatus;
   wherein in a second mode the hydraulic fluid flow is fluidly communicated through the second hydraulically actuated pumping apparatus to the first hydraulically actuated pumping apparatus;
   wherein the method switches between the first and second modes when a pressure drop in hydraulic fluid pressure associated with the hydraulic fluid flowing through the first and second shuttle valves is detected.

2. The method of claim 1, wherein the first and second hydraulically actuated pumping apparatuses are operating 180° out of phase.

3. The method of claim 1, further comprising:
   generating the hydraulic fluid flow with electrical power from the first internal combustion engine; and
   adjusting the hydraulic fluid flow whereby the electrical power employed to generate the hydraulic fluid flow is less than a predetermined value as a function of engine operating conditions.

4. The method of claim 1, wherein the gaseous fuel is supplied additionally to a second internal combustion engine, the method further comprising:
   generating a first portion of the hydraulic fluid flow with electrical power received from the first internal combustion engine;
   generating a second portion of the hydraulic fluid flow with electrical power received from the second internal combustion engine;
   adjusting the first portion of hydraulic fluid flow such that the electrical power received from the first internal combustion engine is less than the first predetermined value as a function of engine operating conditions; and
   adjusting the second hydraulic fluid flow such that the electrical power received from the second internal combustion engine is less than a second predetermined value as a function of engine operating conditions.

5. The method of claim 4, further comprising combining the electrical power from the first internal combustion engine with the electrical power from the second internal combustion engine, wherein the combined electrical power is employed to generate the hydraulic fluid flow.

6. The method of claim 1, further comprising fluidly communicating the hydraulic fluid flow to a hydraulic fluid reservoir bypassing the first and second hydraulically actuated pumping apparatuses.

7. A gaseous fuel pumping system comprising:
   a hydraulic fluid reservoir;
   a first hydraulic pump fluidly connected with the hydraulic fluid reservoir;
   a first cryogenic pumping apparatus comprising a first hydraulic motor having a first piston reciprocating in a first cylinder, the first piston comprising a first shuttle valve for selective fluid communication of hydraulic fluid through the first piston, the first shuttle valve in a closed position when the first piston travels in the first cylinder and in an open position when the first piston is at opposite ends of the first cylinder;
   a second cryogenic pumping apparatus comprising a second hydraulic motor having a second piston reciprocating in a second cylinder, the second piston comprising a second shuttle valve for selective fluid communication of hydraulic fluid through the second piston, the second shuttle valve in a closed position when the second piston travels in the second cylinder and in an open position when the second piston is at opposite ends of the second cylinder; and
   a fluid switching apparatus operatively and fluidly connected with the hydraulic fluid reservoir, the first hydraulic pump and the first and second hydraulic motors, the fluid switching apparatus actuatable between a first position and a second position;

wherein in the first position hydraulic fluid flows from the hydraulic pump to the first hydraulic motor, and from the first hydraulic motor to the second hydraulic motor, and from the second hydraulic motor to the hydraulic fluid reservoir;

wherein in the second position hydraulic fluid flows from the hydraulic pump to the second hydraulic motor, from the second hydraulic motor to the first hydraulic motor, and from the first hydraulic motor to the hydraulic fluid reservoir.

8. The gaseous fuel pumping system of claim 7, wherein the first hydraulic pump is a variable displacement hydraulic pump.

9. The gaseous fuel pumping system of claim 7, wherein the first hydraulic pump is a swash plate pump and hydraulic flow from the first hydraulic pump is adjusted by adjusting a swash plate angle.

10. The gaseous fuel pumping system of claim 7, further comprising a first electric motor connected with and driving the first hydraulic pump; wherein the hydraulic flow from the first hydraulic pump is adjusted by adjusting the speed of the first electric motor.

11. The gaseous fuel pumping system of claim 7, wherein the gaseous fuel pumping system supplies gaseous fuel to a first internal combustion engine, the gaseous fuel pumping system further comprising:
a first electric motor receiving electrical power from the first internal combustion engine and driving the first hydraulic pump;
an electronic controller operatively connected with at least one of the first electric motor and the first hydraulic pump to command the hydraulic flow, the electronic controller programmed to adjust the hydraulic flow such that the instantaneous electrical power consumption of the first electric motor is below a first predetermined value, wherein the predetermined value is a function of operating conditions of the first internal combustion engine.

12. The gaseous fuel pumping system of claim 11, wherein the gaseous fuel pumping system supplies gaseous fuel to a second internal combustion engine, the gaseous fuel pumping system further comprising:
a second hydraulic pump fluidly connected with the hydraulic fluid reservoir and fluidly connected with the first hydraulic pump such that the hydraulic outputs of the first and second hydraulic pumps are combined; and
a second electric motor receiving electrical power from the second internal combustion engine and driving the second hydraulic pump;
wherein the electronic controller is operatively connected with at least one of the second electric motor and the second hydraulic pump to command the hydraulic flow from the second hydraulic pump, the electronic controller programmed to adjust the hydraulic flow from the second hydraulic pump such that the instantaneous electrical power consumption of the second electric motor is below a second predetermined value, wherein the second predetermined value is a function of operating conditions of the second internal combustion engine.

13. A gaseous fuel pumping system supplying gaseous fuel to a first internal combustion engine, the gaseous fuel pumping system comprising:
a hydraulic fluid reservoir;
a first electric motor receiving electrical power from the first internal combustion engine;
a first hydraulic pump connected with and driven by the first electric motor and fluidly connected with the hydraulic fluid reservoir;
a first cryogenic pumping apparatus;
a fluid switching apparatus fluidly connected with the first hydraulic pump, the hydraulic fluid reservoir, and the first cryogenic pumping apparatus, the fluid switching apparatus actuatable to control the direction of hydraulic fluid flow from the first hydraulic pump through the first cryogenic pumping apparatus; and
an electronic controller operatively connected with at least one of the first electric motor and the first hydraulic pump; the electronic controller programmed to command the at least one of the first electric motor and the first hydraulic pump to adjust the hydraulic fluid flow such that the instantaneous electrical power consumption of the first electric motor is below a first predetermined value, wherein the first predetermined value is a function of operating conditions of the first internal combustion engine.

14. The gaseous fuel pumping system of claim 13, further comprising a second cryogenic pumping apparatus fluidly connected with the fluid switching apparatus and fluidly connected in tandem with the first cryogenic pumping apparatus.

15. The gaseous fuel pumping system of claim 13, wherein the first hydraulic pump is one of a fixed displacement pump and a variable displacement pump.

16. The gaseous fuel pumping system of claim 13, further comprising:
a second electric motor receiving electrical power from a second internal combustion engine; and
a second hydraulic pump connected with and driven by the second electric motor, the hydraulic fluid flow from the first hydraulic pump combined with the hydraulic fluid flow from the second hydraulic pump;
wherein the electronic controller is operatively connected with at least one of the second electric motor and the second hydraulic pump;
wherein the electronic controller is further programmed to command the at least one of the second electric motor and the second hydraulic pump to adjust the hydraulic fluid flow such that the instantaneous electrical power consumption of the second electric motor is below a second predetermined value, wherein the second predetermined value is a function of operating conditions of the second internal combustion engine.

* * * * *